United States Patent [19]
Anderson

[11] 4,007,878
[45] Feb. 15, 1977

[54] ADJUSTABLE DRY PENDANT SPRINKLER HEAD ASSEMBLY

[75] Inventor: James R. Anderson, Berwyn, Pa.

[73] Assignee: Central Sprinkler Corporation, Lansdale, Pa.

[22] Filed: Aug. 19, 1976

[21] Appl. No.: 716,065

[52] U.S. Cl. .............................. 239/209; 239/281; 169/37; 285/302; 285/323

[51] Int. Cl.² .................. B05B 15/08; A62C 37/10; F16L 15/02

[58] Field of Search ...................... 169/37, 51, 42; 239/209, 280, 280.5, 281; 285/302, 322, 323

[56] References Cited
UNITED STATES PATENTS

| | | | |
|---|---|---|---|
| 1,206,658 | 11/1916 | Berryman | 285/302 X |
| 3,529,671 | 9/1970 | Adams | 285/302 X |
| 3,675,952 | 7/1972 | Mears | 285/302 |
| 3,847,392 | 11/1974 | Horwinski | 239/209 X |
| 3,958,819 | 5/1976 | Tifft | 285/302 |

FOREIGN PATENTS OR APPLICATIONS

| | | | |
|---|---|---|---|
| 532,464 | 8/1931 | Germany | 285/322 |
| 343,450 | 2/1931 | United Kingdom | 285/323 |

Primary Examiner—Robert S. Ward, Jr.
Attorney, Agent, or Firm—Gold & Litman Fishburn

[57] ABSTRACT

An adjustable drop nipple is disclosed for installing fire protection sprinkler systems which comprise sprinkler head assemblies of the dry, pendant type. The downwardly extending length of a drop nipple having a sprinkler head thereon is adjusted by sliding the nipple axially in a collet having an externally tapered section that engages an internally tapered section of a stationary collet holder. When a selected drop length has been established, the collet is then compressed axially against the collet holder with tightening means whereby the nipple is firmly gripped by the collet so that axial sliding thereof is prevented, thereby maintaining the nipple at the selected drop length.

20 Claims, 6 Drawing Figures

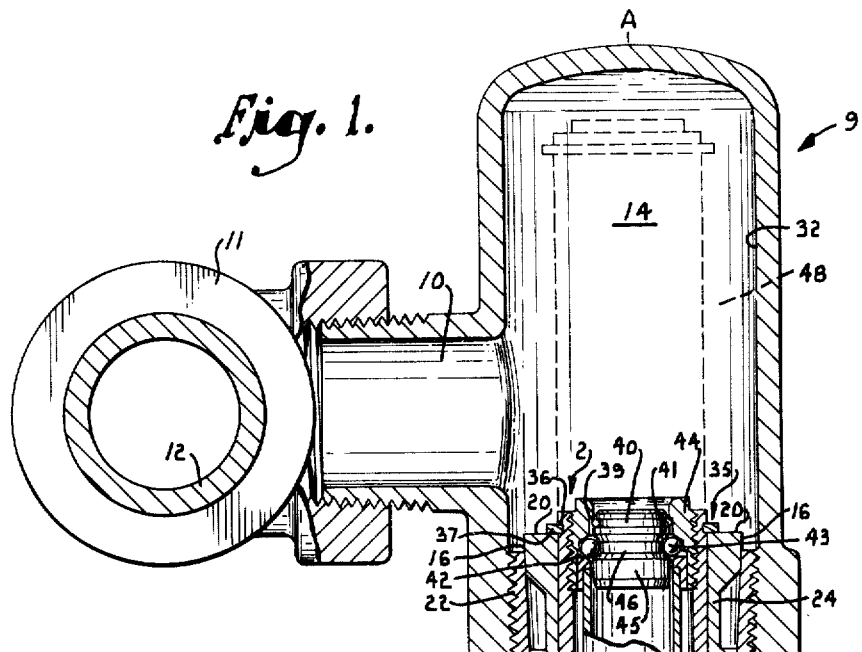
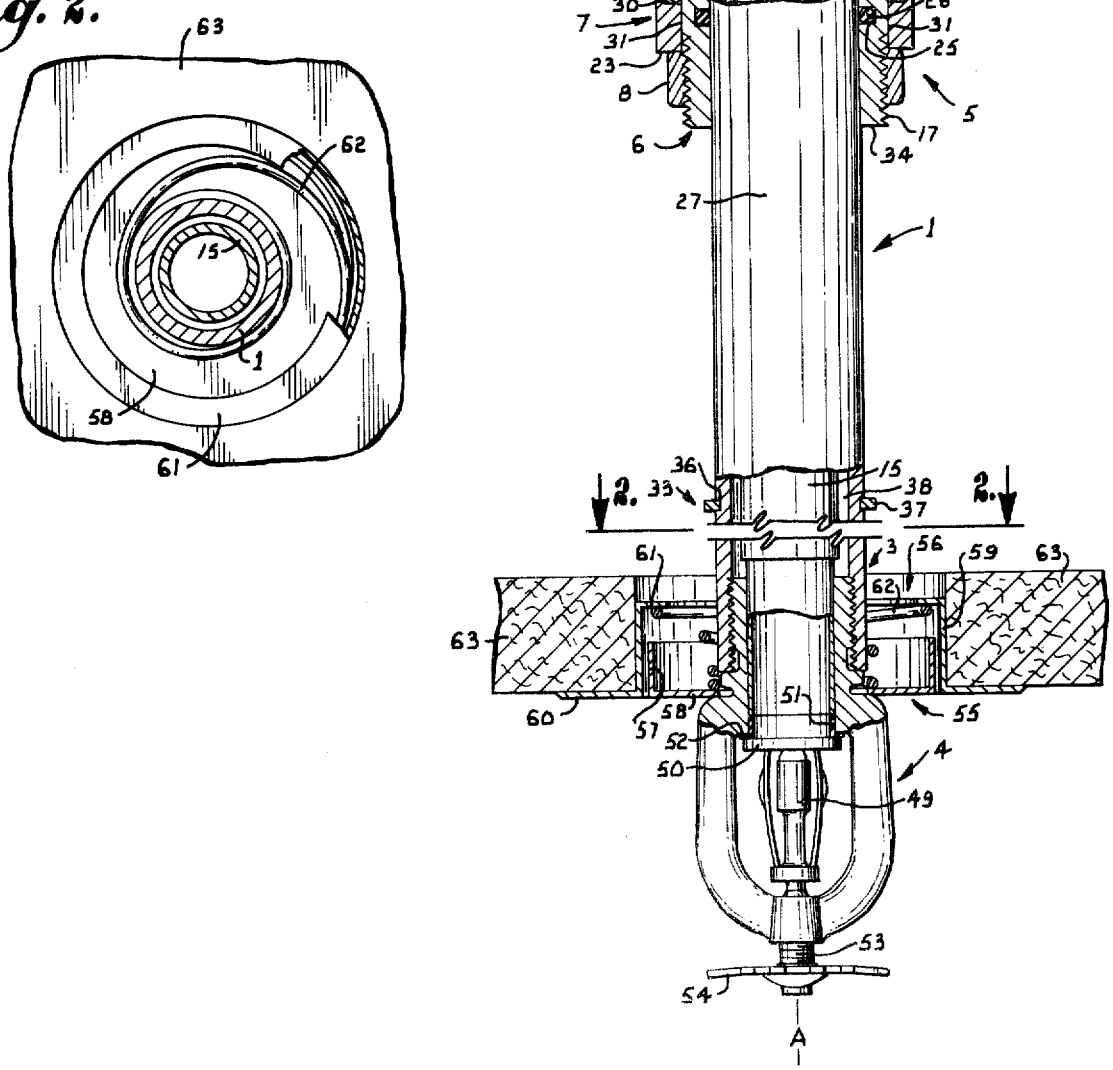
Fig. 1.
Fig. 2.

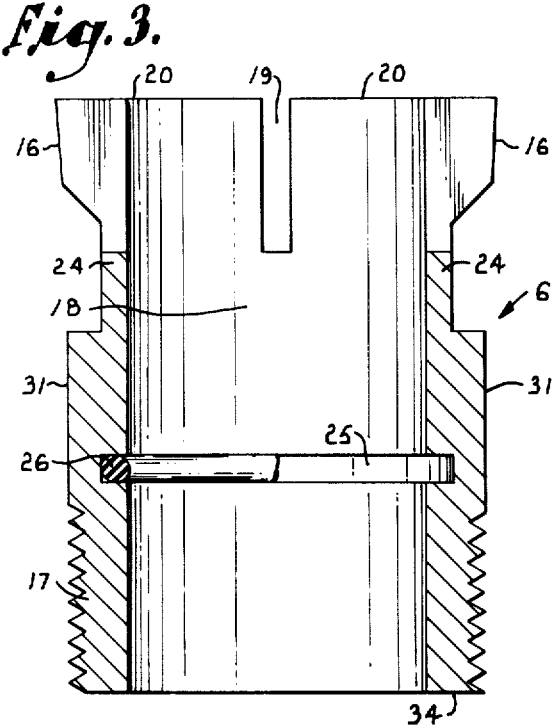
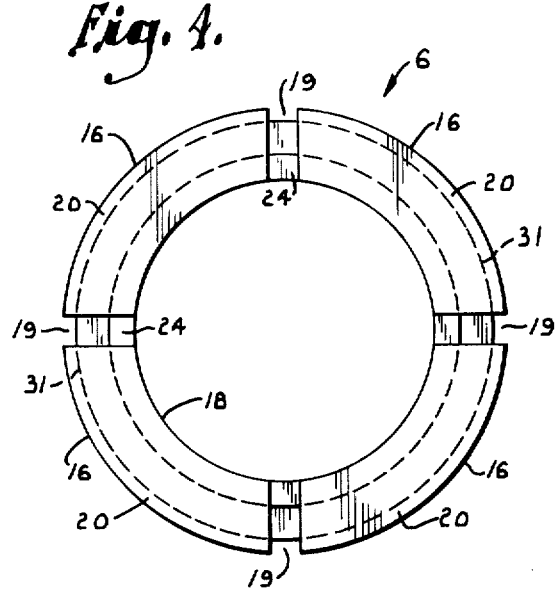
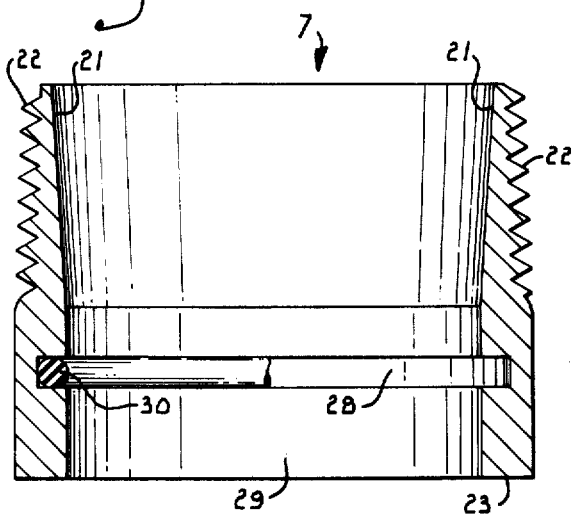
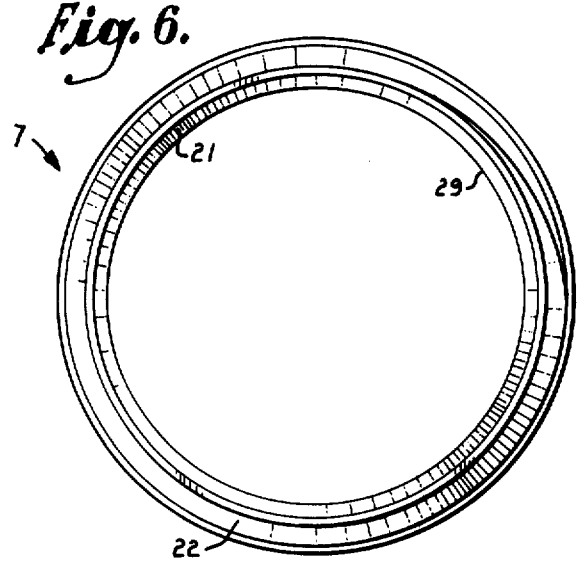

ADJUSTABLE DRY PENDANT SPRINKLER HEAD ASSEMBLY

BACKGROUND OF THE INVENTION

This invention pertains to fire protection sprinkler systems and more particularly pertains to an adjustable drop nipple for use with sprinkle head assemblies of the dry, pendant type, i.e. systems which contain a compressed gas such as air until such time as the sprinkler heads operate, and wherein the sprinkler head assemblies extend downwardly to a finished ceiling line from a distribution network which supplies a fire extinguishing fluid to the sprinkler heads in the event of a fire.

When suspending sprinkler heads from a distribution system for alignment with a dropped ceiling, the drop nipples for the heads cannot all be cut to the same length if precise alignment of each head with the ceiling is to be accomplished. Such alignment problems result from the fact that neither the distribution system nor the ceiling below it can be installed perfectly level, so that the vertical distance between the two is subject to significant variation. It is thus not possible to precut the drop nipples to correct lengths prior to installing the ceiling, and such is difficult and time consuming once the ceiling is in place. In addition, either or both of the ceiling and the distribution system can be disturbed and rendered unlevel even after installation thereof by settling and shifting of a building in which they are installed.

Adjustable drop nipples for sprinkler heads have been devised which comprise telescoping lengths of conduit whereby the overall length of the assembly can be adjusted by moving a lower conduit axially within an upper, stationarily mounted conduit to arrive at a selected drop length that is then maintained by means which prevents further axial movement of the lower conduit. Such adjustable drop nipples are disclosed, for instance, in U.S. Pat. Nos. 3,529,671; 3,675,952 and 3,807,503. As can be seen therein, the selected drop length of the nipple is adjusted and maintained by turning threaded elements such as an adjusting screw or the lower conduit of the telescoping assembly itself, or by axially sliding the lower conduit within the upper conduit and then locking it in place with threaded rollers. These prior adjustable drop nipples have not proven altogether satisfactory for one reason or another, including complex and expensive construction, lack of rigidity and difficulty of sealing between the walls of the upper and lower conduits, and unacceptable time requirements for installation.

SUMMARY OF THE INVENTION

It is, therefore, an object of the present invention to provide an improved adjustable drop nipple for use with sprinkler heads whereby the previously mentioned disadvantages of prior adjustable drop nipples are alleviated.

Another object is to provide an adjustable drop nipple having improved means whereby a desired drop length can be easily established and then maintained after installation of the nipple.

Yet another object is to provide an adjustable drop nipple that is relatively simple and inexpensive to build, yet which effectively fulfills its intended purpose.

Still another object is to provide an adjustable drop nipple which can be attached to a supply line with an interconnecting means and which can then be adjusted to a desired drop length, within a broad range of lengths, without restricting flow of fluid through the drop nipple when an attached sprinkler head becomes operative.

Even another object is to provide an adjustable drop nipple having effective, durable air and water-tight sealing means which functions at any selected drop length to which the assembly has been adjusted.

Another object is to provide an improved drop nipple having a non-telescoping inner guide tube made from a metal that is more resistant to corrosion than an outer, heavier conduit that surrounds it.

Other objects and advantages of the present invention will become apparent from the following description, the drawings, and the appended claims.

The present invention is an improved vertically adjustable drop nipple which comprises a nipple, a collet through which the nipple is inserted axially and which has an externally tapered section thereon, a collet holder having an internally tapered section therein and into which the collet is inserted, with the externally and internally tapered sections of the collet and the holder being in confronting abutment against each other. Tightening means are used whereby the collet is thrust axially within the collet holder and is thereby compressed for gripping said nipple therewith so as to securing it from further axial movement in the collet following establishment of a desired drop length by sliding the nipple axially in either direction therein.

Accordingly, the externally tapered section of the collet can comprise axially projecting, inwardly flexible, resilient segments which are separated by open ended slots in the wall of the tapered section. When the collet is thrust axially within the collet holder, the segments can thus flex inwardly for gripping the nipple, and can spring back outward for release of the nipple when the tightening means is loosened.

BRIEF DESCRIPTION OF THE DRAWINGS

FIG. 1 is a side elevation view, partially broken and in section, of an adjustable drop nipple assembly constructed in accordance with the present invention.

FIG. 2 is a cross-sectional view taken along line 2—2 of FIG. 1.

FIG. 3 is a side elevation view, in section, of an externally tapered collet that can be used with the adjustable drop nipple of the present invention.

FIG. 4 is a topview of the collet shown in FIG. 3.

FIG. 5 is a side elevation view, in section, of a collet holder that can be used with the collet shown in FIGS. 3 and 4.

FIG. 6 is a top view of the collet holder shown in FIG. 5.

DESCRIPTION OF PREFERRED AND ALTERNATIVE EMBODIMENTS

In FIG. 1, the drop nipple assembly represented therein comprises nipple 1 having an upper end 2 and a lower end 3, a sprinkler head 4 threadedly connected to the lower end, and tightening means 5 which comprises an externally tapered collet 6, an internally tapered collet holder 7, and a locknut 8 that is threadedly attached to the collet. A right angle connector 9 is threadedly attached to the upper end of the collet holder 7, and comprises an inlet 10 which leads from a pipe tee 11 in a supply line 12 that conveys a fire extinguishing liquid that is fed into the connector 9 and conduit 1 when the sprinkler head is activated in the event of a fire. The connector has a closed end 13 opposite collet holder 7, and the connector thus comprises a chamber 14 into which the inlet 10 leads.

Line A—A represents the longitudinal axis of the conduit 1, and is also the longitudinal alignment axis for the sprinkler head 4, collet 6, collet holder 7, locknut 8, the connector 9, chamber 14 of the connector, and the inner guide tube 15 and its associated parts, whereas the inlet 10 is oriented transversally with respect to axis A—A.

Referring particularly to FIGS. 3 and 4, the collet 6 that is illustrated therein has an externally tapered section 16 at one end, an externally threaded section 17 at the other end, and a straight, axial, cylindrical bore 18 through which the nipple is inserted axially. The internal diameter of the bore is sized for slip-fitting of the drop nipple therein so that it will slide back and forth in the collet for adjusting the distance to which the nipple extends downward from the connector 9. Accordingly, the inside diameter of the bore 18 should be several mils larger than the outside diameter of the nipple 1. Open ended slots 19 in the wall of the externally tapered section 16 of the collet divides that section into axially projecting, flexible segments 20 which flex transversally inwards and grip the nipple 1 when, as will be further described subsequently, the segments are squeezed inward by the collet holder by use of the tightening means. Flexure of the segments transversally with respect to axis A—A can be enhanced by thinning the wall of the collet between the tapered section at one end and the threaded section at the other end to provide a thinned wall section 24.

The collet holder 7 that is illustrated in FIGS. 1, 5 and 6 has an internally tapered section 21 at one end and a set of external threads 22 on the same end. As can be seen in FIG. 1, the external threads of the collet holder are screwed into matching threads on the connector 9 opposite the closed end 13 thereof, and the collet holder is thereby rendered stationary against movement by adjustment of the nipple 1 and the collet 6 during establishment of a selected drop length. Collet 6 is shown as being inserted axially into collet holder 7 so that the externally and the internally tapered segments thereof are confrontingly abutted. Locknut 8 is shown as being screwed onto the threaded section 17 of the collet to a point thereon where it rests against the outer end 23 of the collet holder. Further tightening of the locknut draws the collet downwards and wedges the externally tapered segments 16 against the internally tapered section 21 of the collet holder, thus causing the segments to flex inward and to very tightly grip the exterior surface of nipple 1 so that it cannot move axially within the collet holder until the locknut is loosened. Preferably, the segments 20 are resilient whereby deformation thereof by inward flexing is not permanent, thereby permitting the segments to spring back outward for release of the nipple when the locknut is loosened.

The drawings illustrate use of a collet and a collet holder having externally and internally tapered sections 16 and 21, respectively, which taper inwardly from the outer ends thereof and toward axis A—A. It will be understood that the taper of these two sections can also be outward from the outermost end thereof and away from the axis A—A, and in which case the locknut could be threadedly attached to the inside of the collet holder so that it bears against the lower end of the collet when tightened in order to move the collet axially upward for wedging the tapered segments thereof against the tapered section of the collet holder. Additionally, the collet holder can, where preferred, be an integral portion of the connector 9, or can be attached to the connector by some other means such as a flange thereon that is fastened to the connector by means of screws or bolts.

Since the drop nipple assembly shown in the drawings will be filled with a pressurized fluid after installation (compressed air, for instance, when a dry system is used), it is important that tightening means 5 include provisions for preventing leakage of the fluid out of the assembly. As shown in the drawings, the collet 6 comprises an internal circumferential groove 25 in the bore 18 with an O-ring 26 therein which seats against the external surface 27 of the nipple 1. In a similar fashion, the collet holder 7 comprises an internal circumferential groove 28 in the inner bore 29 and has an O-ring 30 therein which seats against the exterior surface 31 of the collet below the tapered section 16 thereof. When the drop nipple assembly is pressurized internally, the O-ring become compressed against the walls of the circumferential grooves, and against surfaces of the collet and the nipple inwardly of the grooves, thereby effecting a seal. Other sealing methods can be used when preferable and practical, e.g. a packing gland can be used.

As was previously indicated, the drop nipple can be attached to a supply line connector 9 by threaded attachment with the collet holder 7. Chamber 14 of the connector is axially elongated and receives the inserted upper end 2 of the nipple 1 axially and has an inlet 10 that is aligned transversally at a right angle to the longitudinal axis of the chamber, the width of the chamber being significantly greater than the outside diameter of the nipple 1, and the length of the chamber being significantly longer than the depth to which the upper end 2 of the nipple is inserted therein. By means of this arrangement, the length of the drop nipple can be adjusted to a length whereby the upper end thereof extends into chamber 14 of the connector past the inlet 10 and toward the closed outer end 13 without restricting flow of a fire extinguishing fluid through the nipple when the sprinkler head is operated. More specifically, the insertion of the nipple 1 into the connector 9 to a maximum insertion distance is indicated by the dotted lines in FIG. 1, and the space 48 between the inner surface of wall 32 of the connector and the outer wall 27 of the inserted end of the nipple is sufficiently large to permit flow of fluid from inlet 10 and into nipple 1 without significantly reducing the flow of a fire extinguishing fluid out of the sprinkler head 4 in the event of a fire.

To assure that the upper end of the nipple 2 is not inserted into chamber 14 to a depth which results in a flow-restricting proximity thereof with the closed end 13 of the connector, a lower slide stopping means 33 can be attached to the lower, uninserted end of the nipple below the tightening means, thereby establishing a maximum insertion distance to which the inserted end can be thrust into the chamber 14 in an axial direction. More specifically, when the nipple 1 is slid axially into chamber 14 for adjustment of the drop length, excessive insertion of the nipple is prevented by abutment of the slide stopping means 33 with the lower end 34 of the collet. The upper, inserted end of nipple 1 can also be provided with a slide stopping means 35 to prevent withdrawal of the nipple too far downwardly into the bore 18 of the collet, or complete withdrawal therefrom, when adjusting the drop length. Accordingly, a first slide stopping means can be provided between the collet 6 and one end of the nipple, whereas a second slide stopping means can be provided between the other end of the nipple and the collet, thereby limiting the distance through which the nipple can slide through the collet, and thereby establishing a range of distance over which the drop length can be shortened or lengthened. Such first and second slide stopping means are useful whether the connector at the upper end of the nipple 1 is an angled connector as shown in the drawings, or a straight connector having an axial inlet for supplying a fire extinguishing fluid into a nipple-receiving chamber therein. Each of the slide stopping means 33 and 35 comprises a resilient snap ring 37 inserted in an external circumferential groove 36 on the nipple 1. Other forms of slide stopping means can be used when preferred.

The drop nipple assembly shown in the drawings comprises an inner guide tube 15 which extends from the sprinkler head 4 to the upper end 3 of the nipple. The guide tube has an external diameter smaller than the inside diameter of the nipple to provide an annular space 38 between the two that is sealed at the upper end. The guide tube is fabricated from sealed at tubing having a different composition than the metal of the nipple in order to provide increased corrosion resistance under conditions of use. Accordingly, the guide tube 15 can be made from relatively thin brass tubing whereas the outer nipple 1 can be formed from steel pipe on tubing that is more rigid than the guide tube. The construction shown in the drawings thus takes advantage of the corrosion resistance of brass while also utilizing the strength of steel, and which is less expensive to build than if the nipple 1 were made entirely of brass. Corrosion resistant metals other than brass can also be used.

The upper end of the nipple contains an axially extending outer sleeve 44 therein which has an internal circumferential shoulder 39, an internal circumferential groove 42 below the shoulder and a resilient snap ring 43 in the groove. The guide tube 15 has an axially extending inner sleeve 45 which is attached to the upper end of the tube and projects outwardly therefrom. The inner sleeve has upper and lower external circumferential grooves 40 and 46 therein with an O-ring 41 inserted in the upper groove. When assembling the drop nipple, the guide tube is inserted into the nipple 1 from the lower end 3, and the inner sleeve 45 is inserted into the outer sleeve 44 until the O-ring 41 is adjacent shoulder 39 of the outer sleeve and the snap ring 43 in groove 42 of the outer sleeve engages groove 46 on the inner sleeve. This engagement of the snap ring 43 with the outer sleeve holds the guide tube in place for threaded attachment of the sprinkler head 4 and engagement of the lower end of the guide tube in a central channel 47 therein. By use of the O-ring 41 between the inner and outer sleeves 46 and 43, respectively, a seal is established when the two sleeves are engaged that prevents leakage of pressurized fluid into the annular space 38 between the tube and the nipple, thereby preventing corrosion of the nipple from the inside.

In FIG. 1, the sprinkler head 4 comprises a thermally activatable element 49 having a cap 50 at the upper end. The cap rests against a polymeric seal ring 51 which extends into the lower end of the central channel 47 of the sprinkler head and has an outwardly projecting ring portion 52 at the lower end of the channel that is abutted by cap 50 of the thermal element. The sealing of the lower end of the central channel 47 is effected by thrusting the thermal element 49 upwards with an adjustment screw 53 so that ring portion 52 of the seal is squeezed tightly between cap 50 of the element and the lower end of the channel. A deflector disc 54 is attached to the lower end of the sprinkler head 4 and serves to atomize and distribute fire extinguishing fluid should thermal element 49 become activated by fire and blown out of the sprinkler head for opening the lower end of the central channel 47 of the sprinkler head.

The drop nipple assembly shown in FIGS. 1 and 2 is equipped with inner and outer escutcheons represented at 55 and 56, respectively. The inner escutcheon comprises an annular, upwardly extending ring 57 which interconnects with the outside of an annular plate 58, and is attached to the sprinkler head 4 by means of the plate 58 and is secured thereon from any substantial movement in an axial or lateral direction. The outer escutcheon 56 comprises an annular ring 59 having a lower, outwardly extending annular plate 60 and an upper, inwardly extending annular plate 61 attached thereto. The inner diameter of the ring 59 is slightly larger than the outer diameter of ring 57 to permit movement of the outer escutcheon 56 axially over the inner escutcheon plate 55. A compressed helical spring 62 estends axially between the rings 58 and 61 of the upper and lower escutcheons and continuously urges the lower plate 61 of the outer escutcheon against a ceiling tile 63.

Installation of the drop nipple shown in the drawings can be accomplished by first attaching a connector such as 9 to a supply line 12. The remainder of the assembly, including the nipple 1 with the attached collet, collet holder, lock rings, sprinkler head and the escutcheons is then thrust upwards through a hole in the ceiling for attachment of the collet holder to the connector. The drop length of the nipple is then adjusted as previously described for alignment of outer plate 60 and inner plate 58 of the inner escutcheons with the ceiling 62. The locknut is then rotated on the threaded end of the collet 19 to effect compression of the tapered segments 20 and gripping of nipple 1 thereby to maintain the established drop length for alignment of the escutcheon plates with the ceiling.

An adjustable drop nipple has now been described which fulfills the previously stated objects, and even though the present invention has been described with reference to particular embodiments thereof, it will nonetheless be understood that still other embodiments will become apparent which are within the spirit and scope of the invention defined in the following claims.

What is claimed and desired to secure by Letters Patent is:

1. A vertically adjustable drop nipple comprising:
   a. a nipple,
   b. a collet through which said nipple is inserted axially and which has an externally tapered section thereon,
   c. a collet holder having an internally tapered section therein and into which said collet is inserted, said externally and internally tapered sections being in confronting abutment against each other, and
   d. tightening means whereby said collet is thrust axially within said holder and is thereby compressed for gripping said nipple and securing it from axial movement within said holder.

2. A drop nipple as in claim 1 wherein said externally tapered section of said collet comprises axially projecting, inwardly flexible segments which are separated by open ended slots in the wall of said externally tapered section.

3. A drop nipple as in claim 2 wherein said externally and internally threaded sections of the collet and the collet holder taper inwardly from the outermost ends thereof toward the longitudinal axis of the collet.

4. A drop nipple as in claim 2 wherein said externally tapered section is at one end of the collet and the other end thereof is externally threaded, and wherein said tightening means comprises an internally threaded nut which is screwed onto said threaded end of said collet.

5. A drop nipple as in claim 4 wherein said tapered section of the collet holder is at one end thereof and is internally tapered, and said nut bears against an opposite end thereof when tightened and axially thrusts said collet into said holder for inward flexing of said segments.

6. A drop nipple as in claim 5 wherein said internally tapered section of the collet holder has external threads thereon.

7. A drop nipple as in claim 1 wherein said collet comprises an internal circumferential groove with an O-ring therein which seats against the external surface of said nipple, and wherein said collet holder comprises an internal circumferential groove with an O-ring therein which seats against the exterior surface of said collet.

8. A drop nipple as in claim 1 wherein said nipple extends through said collet and further comprising a first slide-stopping means on said conduit between said collet and one end of the conduit, and a second slide-stopping means on the conduit between said collet and the other end of the conduit.

9. A drop nipple as in claim 8 wherein each of said first and second slide-stopping means comprises an external circumferential groove in the wall of said nipple and a resilient snap ring in said groove.

10. A drop nipple as in claim 1 and further comprising a supply line connector attached to said collet holder, said connector having an elongated chamber which receives an inserted end of said nipple axially, the width of said chamber being significantly greater than the outside diameter of the nipple, and the length thereof being significantly longer than the depth to which said end of the nipple is inserted therein.

11. A drop nipple as in claim 10 and further comprising a sprinkler head attached to said nipple at the end opposite said inserted end.

12. A drop nipple as in claim 11 and further comprising an escutcheon plate attached to said sprinkler head and a spring which urges the escutcheon plate toward said inserted end of the nipple.

13. A drop nipple as in claim 1 wherein said nipple has an upper end and a lower end, a sprinkler head attached to the lower end, a guide tube which extends from the sprinkler head to said upper end of the nipple and which has an external diameter smaller than the inside diameter of the nipple, and sealing means at said upper end of the nipple for sealing the space between the tube and the nipple.

14. A drop nipple as in claim 13 wherein the upper end of said nipple contains an axially extending outer sleeve therein, said outer sleeve having an internal circumferential groove below said shoulder, a resilient snap ring in said internal groove, and wherein said guide tube has an axially extending inner sleeve which projects from the upper end of the tube and has upper and lower external circumferential grooves therein and an O-ring inserted in the upper groove, and wherein said inner sleeve is inserted in said outer sleeve with said O-ring abutted against said shoulder of the outer sleeve and with said snap ring engaged in said lower groove of the inner sleeve.

15. A drop nipple as in claim 13 and further comprising said sprinkler head having a central channel therein into which the lower end of said guide tube is inserted.

16. A drop nipple as in claim 1 wherein said collet has a straight cylindrical bore therein through which said nipple is inserted axially, and the internal diameter of said bore is sized for slip-fitting of said nipple therein.

17. A drop nipple as in claim 10 wherein said nipple extends through said collet and has slide stopping means on the uninserted end thereof below said tightening means which establishes a maximum insertion distance to which said inserted end of the nipple can be thrust into said connector in an axial direction, and wherein said inserted end of the nipple extends past said inlet to the connector and falls short of reaching said closed end when at said maximum insertion distance in said connector.

18. A drop nipple as in claim 10 wherein said connector comprises a closed end opposite said collet holder, and further comprises an inlet aligned transversally with respect to the longitudinal axis of the connector.

19. A drop nipple as in claim 1 comprising an assembly of said nipple and a sprinkler head attached to one end of the nipple, and further comprising:
   a. a first annular escutcheon plate which is attached to said assembly and extends transversally outwardly therefrom,
   b. a second annular escutcheon plate which has an inner diameter larger than the outer diameter of said first plate and which is axially movable and axially alignable with said first plate, and
   c. a compressed spring which urges said second plate axially with respect to said first plate.

20. A drop nipple as in claim 19 wherein said first escutcheon plate comprises an annular ring at the outer edge thereof which extends axially with respect to said nipple, and said second escutcheon plate comprises an annular ring leading from the inner edge thereof which extends axially adjacent said annular ring of the first escutcheon plate and has an inner annular plate thereon which projects inwardly toward said nipple.

* * * * *